United States Patent
Premarini et al.

(10) Patent No.: US 9,596,642 B2
(45) Date of Patent: Mar. 14, 2017

(54) WIRELESS NETWORK WITH MULTIPLE PATHS BETWEEN NODES

(71) Applicant: Life Safety Distribution AG, Hegnau (CH)

(72) Inventors: Giuseppe Premarini, Trieste (IT); Michele Susel, Trieste (IT); Daniel Merli, Trieste (IT); Martin John Caudell, Henfield (GB)

(73) Assignee: LIFE SAFETY DISTRIBUTION AG, Hegnau (CH)

( * ) Notice: Subject to any disclaimer, the term of this patent is extended or adjusted under 35 U.S.C. 154(b) by 127 days.

(21) Appl. No.: 14/579,065

(22) Filed: Dec. 22, 2014

(65) Prior Publication Data

US 2016/0183160 A1 Jun. 23, 2016

(51) Int. Cl.
| | |
|---|---|
| H04L 12/28 | (2006.01) |
| H04W 40/10 | (2009.01) |
| H04W 52/02 | (2009.01) |
| H04L 12/24 | (2006.01) |
| H04W 84/18 | (2009.01) |

(52) U.S. Cl.
CPC ......... *H04W 40/10* (2013.01); *H04L 41/0803* (2013.01); *H04W 52/0203* (2013.01); *H04W 84/18* (2013.01)

(58) Field of Classification Search
CPC .......................... H04W 40/10; H04W 52/0203
USPC ..................... 370/393, 395.54, 425
See application file for complete search history.

(56) References Cited

U.S. PATENT DOCUMENTS

| | | | | |
|---|---|---|---|---|
| 7,639,663 | B1* | 12/2009 | Nerses | H04L 47/14 370/347 |
| 9,338,727 | B2* | 5/2016 | Castagnoli | H04L 45/02 |
| 2003/0117966 | A1 | 6/2003 | Chen | |
| 2005/0078647 | A1 | 4/2005 | Meier et al. | |
| 2005/0122231 | A1* | 6/2005 | Varaiya | H04W 40/22 340/870.01 |
| 2007/0133592 | A1* | 6/2007 | Zheng | H04W 74/04 370/458 |
| 2008/0232334 | A1* | 9/2008 | Das | H04W 48/08 370/337 |
| 2010/0135262 | A1* | 6/2010 | Park | H04L 45/021 370/337 |

FOREIGN PATENT DOCUMENTS

WO   WO 2008/095127 A2   8/2008

OTHER PUBLICATIONS

Huang et al.,"Bounded Stretch Geographic Homotopic Routing in Sensor Networks", IEEE INFOCOM 2014—IEEE Conference on Computer Communications, IEEE, pp. 979-987, Apr. 27, 2014.
Extended European search report from corresponding EP patent application 15199949.7, dated Apr. 26, 2016.

* cited by examiner

*Primary Examiner* — Ricky Ngo
*Assistant Examiner* — Dewanda Samuel
(74) *Attorney, Agent, or Firm* — Husch Blackwell LLP

(57) ABSTRACT

A wireless communications system includes both a primary communications path, wherein a gateway can communicate with each member of a plurality of ambient condition detectors, and a secondary back-up path available in the event of a failure on part of the primary path. Required power for the network can be minimized by path selection.

12 Claims, 9 Drawing Sheets

WIRELESS NETWORK WITH MULTIPLE PATHS BETWEEN NODES

FIELD

The application pertains to wireless or mesh networks. More particularly, the application pertains to such networks that provide multiple links between a gateway and various displaced nodes or devices.

BACKGROUND

A wireless network is a system whose devices communicate each other through radio waves, without using cables. The basic element of the network is called a node, and the root node is typically referred to as the gateway. This gateway is the main interface between the wireless network and an external system, which is typically an existing wired fire system handled by a panel.

The gateway is in charge of translating the messages traveling between wired (panel) and wireless (nodes) domains in order to make the wireless nodes "attached" to the gateway and visible to the panel of the wired network as if they would be physically connected to the wired network. All wireless devices except the gateway are battery powered. Therefore, the current consumption will preferably be kept to the lowest possible level in order to maximize devices' lifetimes.

A node typically consumes most of the power while communicating with other nodes; the most power saving configuration (topology) is the star, as illustrated in FIG. 1, in which the number of links of every single node is limited to the minimum required to meet network constraints.

The star configuration can only be used if the communications link (both physical distance and obstacles) between nodes and the gateway is good enough to allow for a direct link between every single node and the gateway. Moreover, it's necessary that all nodes are able to establish a good enough link with at least one other node in order to guarantee that a secondary path is always available. In most cases, not all nodes are able to communicate directly with the gateway. Therefore, they communicate with the node closest to them, which, in turn, will forward the received information.

DETAILED DESCRIPTION

Figure 1:
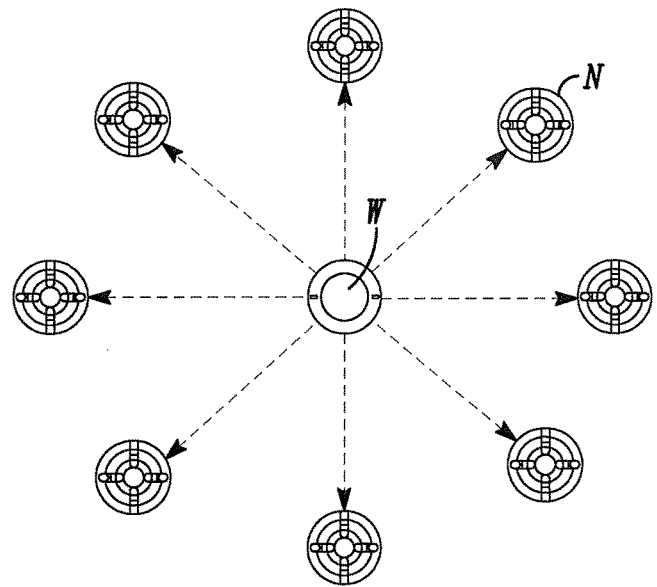
FIG. 1 is a diagram of a star network.

While disclosed embodiments can take many different forms, specific embodiments hereof are shown in the drawings and will be described herein in detail with the understanding that the present disclosure is to be considered as an exemplification of the principles hereof as well as the best mode of practicing the same and is not intended to limit the claims hereof to the specific embodiment illustrated.

Figure 2:
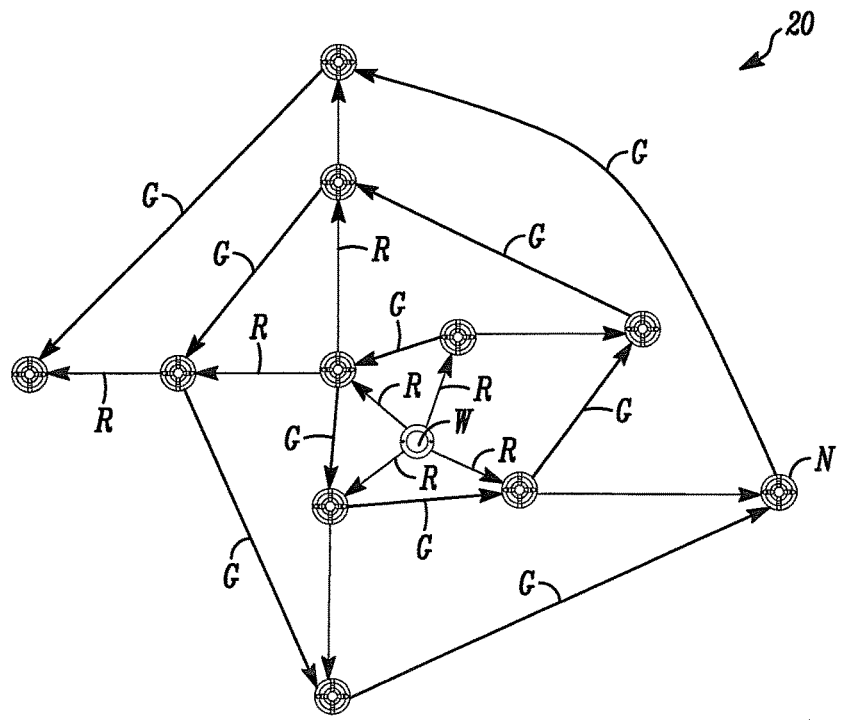
FIG. 2 is a diagram of an initial embodiment in accordance herewith.

In embodiments hereof, a wireless system functions reliably even if one of its nodes fails to transmit its information. As discussed below, such information from an originating node will have at least two paths or links to reach a gateway. FIG. 2 illustrates an exemplary mesh configuration 20 in which each node N is able to communicate with or reach the rest of the network through at least two different paths.

In FIG. 2, the path(s) labeled R are primary paths. The path(s) labeled G are secondary paths. The noted paths correspond to wireless communications paths. The gateway, which might be coupled to and communicate with an alarm monitoring system, is labeled W. A plurality of nodes labeled N can communicate with the gateway via at least two different paths or communications links. Nodes can be implemented as ambient condition detectors of all types, alarm indicating output devices, or any other type of useful module without limitation.

For each node N, the node that precedes it in a primary path is called a primary parent, and the one that follows is called a primary child. The same concept applies to the secondary path. The primary path(s) always originates from the gateway W. Each node typically has a physical address normally settable by a switch and a network address hereafter called a slot address by which the node is recognized during the wireless communications process.

As explained below, the present process generates slots or slot addresses for nodes of a mesh wireless network that complies with the following constraints:

a) The gateway W is always allocated at the lowest slot (i.e. slot 0);

b) The slot of a node N must be greater than the slot of its primary and secondary parents;

c) The slot of a secondary parent of a node N must be greater than the slot of the primary parent;

d) All nodes must have both a primary and secondary parent when not in contradiction with constraints b) and c);

e) The slot address of the nodes N must increase in response to moving away from the gateway W;

f) The gateway W is allowed to have all of the network nodes N as its primary children;

g) Each node other than the gateway is allowed to have, at most, 2 primary children;

h) Each node other than the gateway is allowed to have, at most, 4 children (as the sum of primary and secondary);

i) The communication between two nodes can take place only at a distance less than a constant dMax, wherein dMax is a calculated value taking into account the physical distance between nodes and radio attenuation factors (e.g.

typical environmental noises and/or obstacles); in other words, dMax is adjusted in order to take into account other factors related to the installation environment, therefore, becoming something like a "radio" distance; and j) All nodes that are within the dMax distance from the gateway must have the gateway as a primary parent.

This also implies that:

k) There is always one node that cannot have the secondary parent, and:
 1. This node must be allocated at slot 1; and
 2. This node's primary parent must be the gateway (slot 0); and l) If available, then the node allocated at slot 2 always has the following parents:
 1. The gateway (slot 0) as a primary parent; and
 2. The node allocated at slot 1 as a secondary parent.

As a prerequisite, each node must be within the distance of dMax from at least one other node. If the network doesn't comply with the prerequisite, then it's mandatory to add one or more nodes in such positions as to meet constraints.

Figure 3:
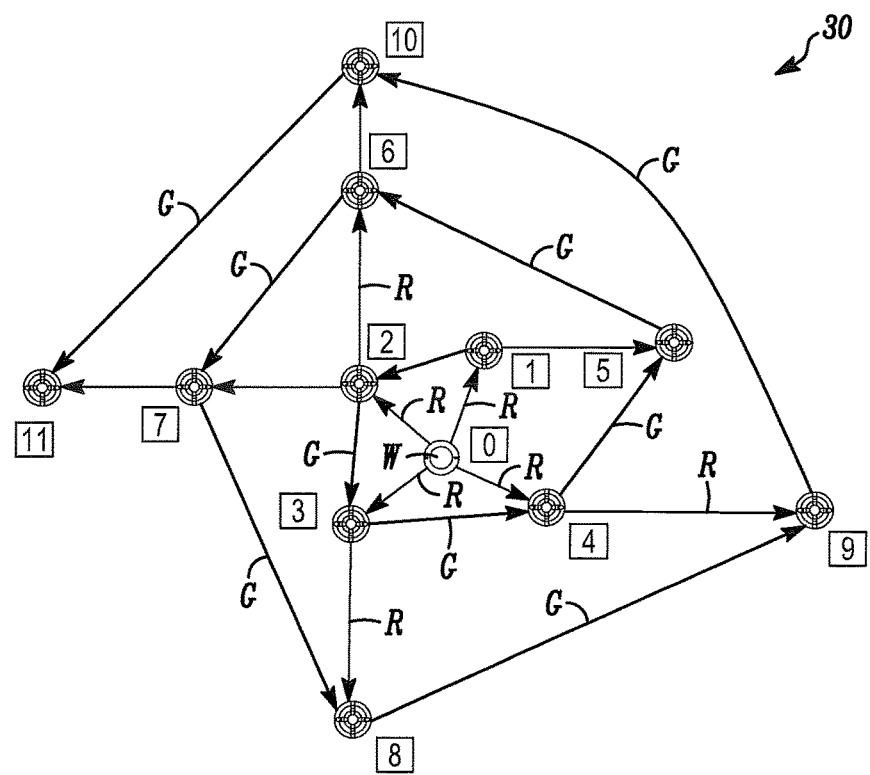
FIG. 3 is a diagram of another embodiment in accordance herewith.

FIG. 3 illustrates an exemplary network 30 that complies with the constraints. Numbers in the boxes indicate the slot address of the respective node.

The process can be logically divided into three parts:
 1. Primary path definition
 2. Slot allocation
 3. Secondary path creation A more detailed description follows. The primary path definition connects all nodes to the gateway by establishing the primary path. In order to optimize power consumption, the number of the gateway's children is maximized. During this step all nodes are assigned a level indicating the number of intermediate nodes between the examined one and the gateway W.

Figure 4:
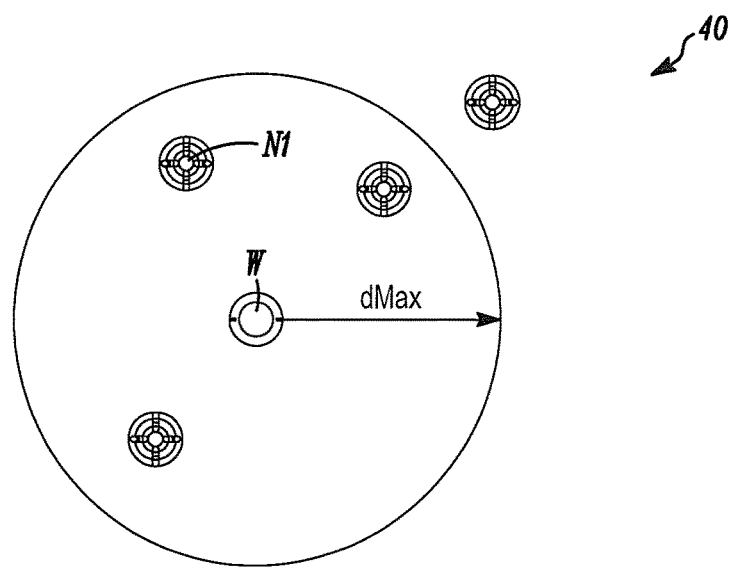
FIG. 4 illustrates aspects of a process in accordance herewith.

With respect to FIG. 4 and the partial network 40 thereon, the nodes N1 that are within the circle of the radius dMax centered at the gateway W are assigned a level of 1 indicated as L1. These nodes shall be directly connected to the gateway W.

Each node with level=1 (L1) searches for the two closest unassigned nodes, but always within the predetermined distance dMax, and connects them to the node. Then, those nodes are assigned a level of 2 (L2).

Figure 5:
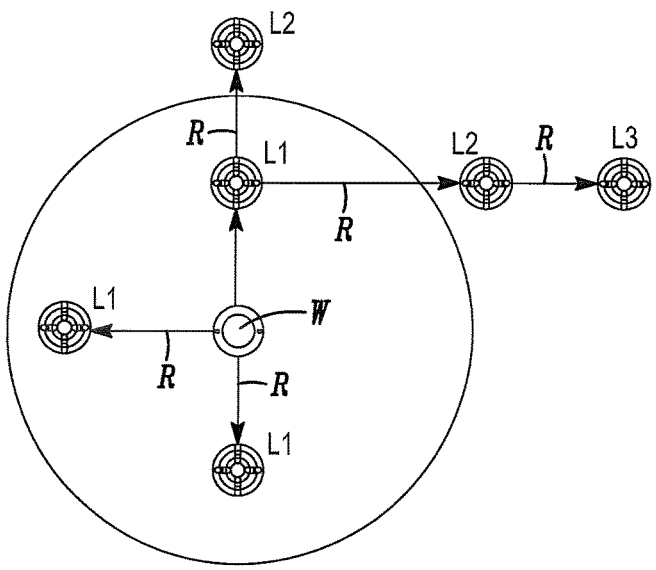
FIG. 5 illustrates further aspects of the process from FIG. 4.

The above process is repeated for each level greater than 1. A primary path is then obtained, as illustrated in FIG. 5.

Figure 6:
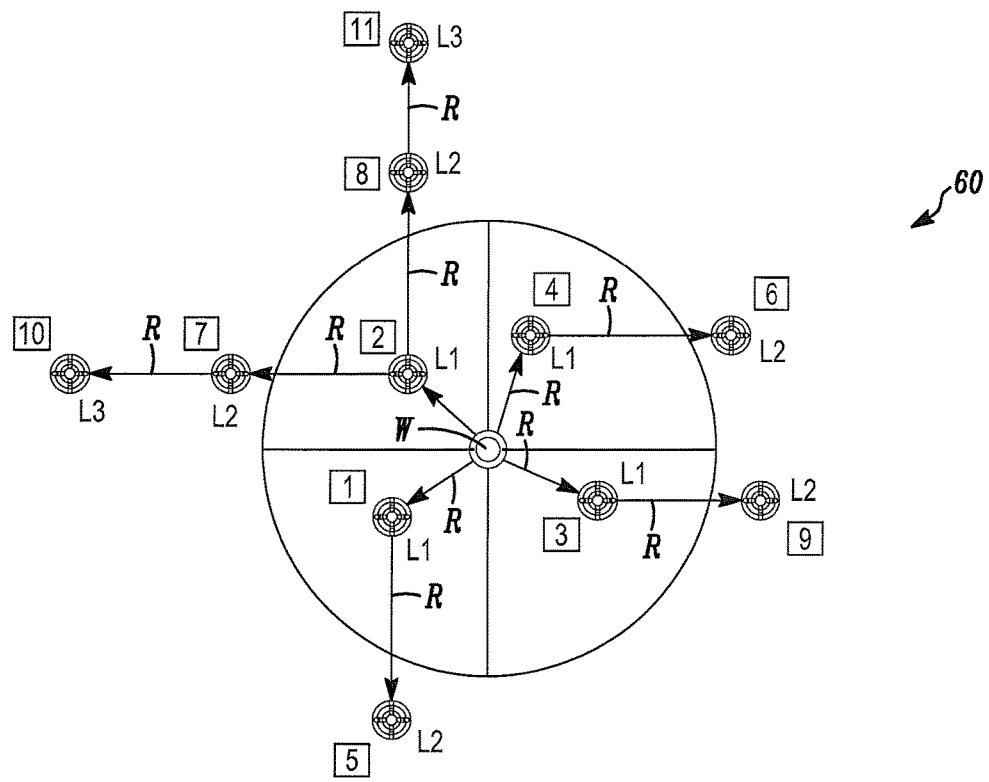
FIG. 6 illustrates an exemplary primary path and node physical addresses.

FIG. 6 illustrates a network 60. The numbers inside the respective squares indicate a node's physical address. This address is not related to the assigned slot or logical address.

Figure 7:
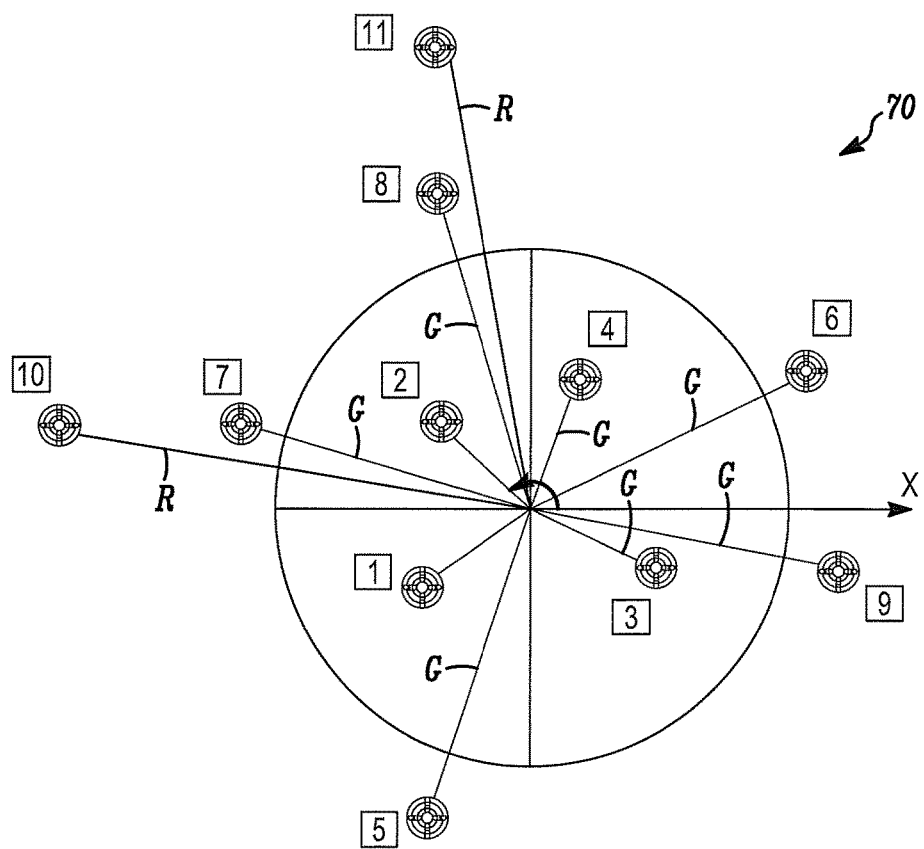
FIG. 7 illustrates additional aspects of the process from FIG. 4.

Next, to carry out slot allocation, with respect to FIG. 7 and the network 70 illustrated therein, a system of orthogonal Cartesian axes centered on the gateway W is established. For each node, the angle (measured counterclockwise) between the X axis and a line connecting the center of the node with the origin of the axis is identified.

Given the nodes' levels and angles, slots are then assigned from 1 to n with the node at level 1 having the lowest angle and the node at the last level having the highest angle. This way, slot 1 is allocated to the node at level 1 having the smallest angle, slot 2 to the node at level 1 having the second smallest angle, and so on. When all nodes at level 1 are allocated, the same procedure is applied to the other levels until all nodes have been allocated.

Figure 8:
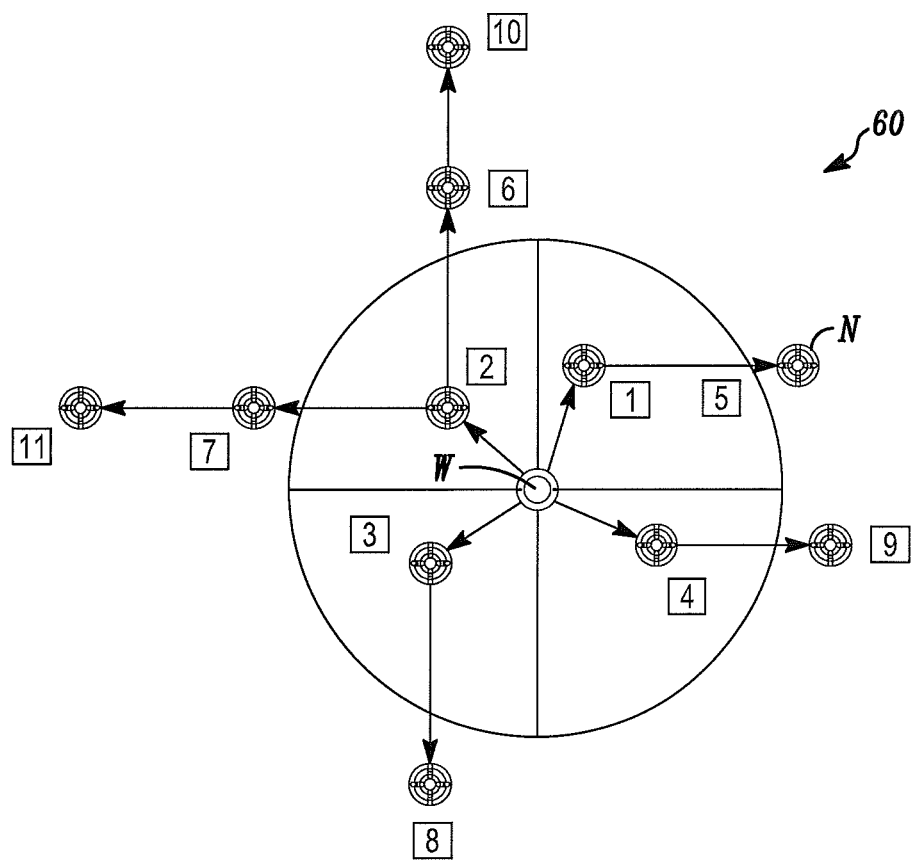
FIG. 8 illustrates slot allocation results relative to a network.

FIG. 8 shows the slot allocation result applied to the analyzed network 60, for example. In FIG. 8, the numbers inside the respective squares indicate the node's slot address.

The slot address 0 is assigned to the gateway W. Given the allocation of the slot addresses, as in FIG. 8, a secondary path meeting the constraints can be created by connecting branches close together.

Figure 9:
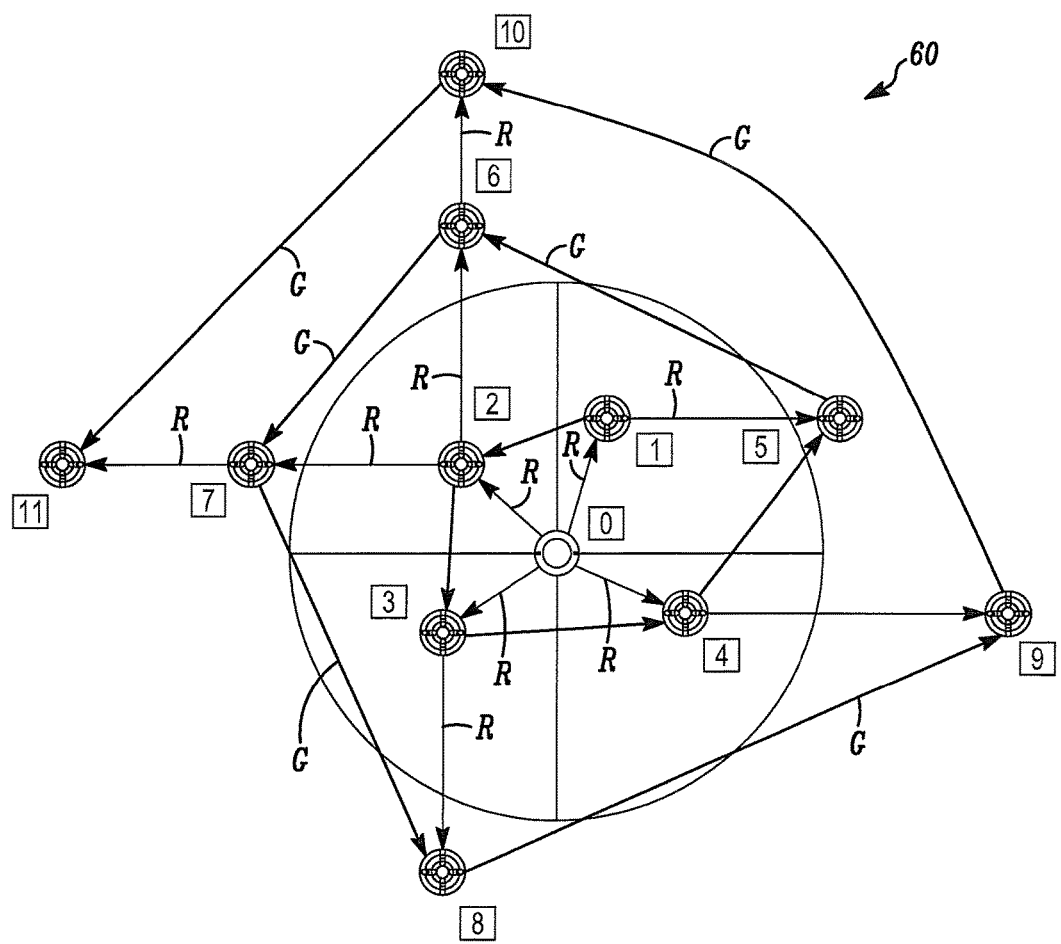
FIG. 9 illustrates a network having both a primary path and a secondary path.

With respect to FIG. 9 and the illustrated network 60, in order to create a secondary path, it's enough to connect the nodes—starting from the one allocated at slot 1 to the closest "unconnected" node—and continue until all of the nodes are connected. At the end, a path in a spiral shape is created. This shape is the one that minimizes the length of the branches of the path.

Figure 10:
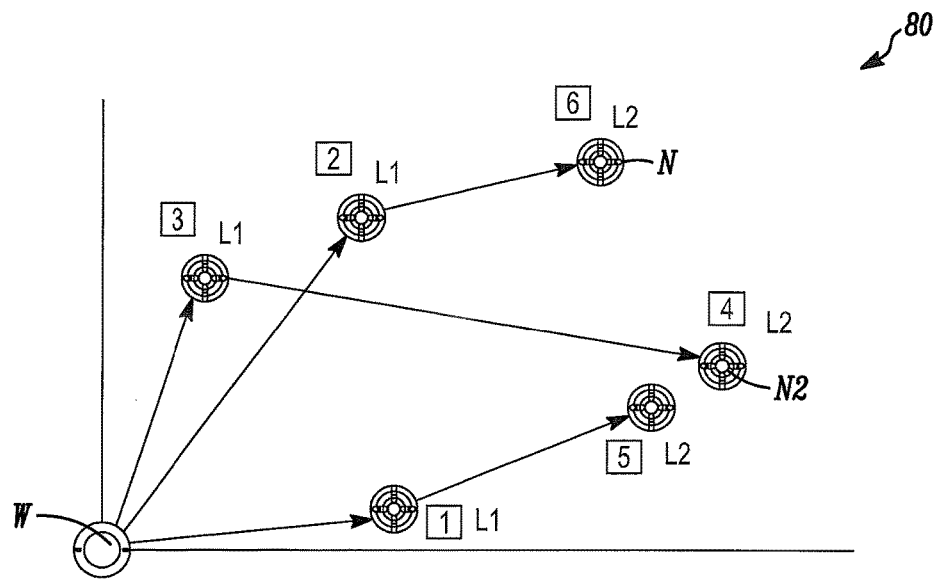
FIG. 10 illustrates where a node cannot be contacted through a secondary path.

For some spatial arrangements of the nodes, as illustrated by the network 80 in FIG. 10, alternate processing is required to generate a complete secondary path. In the case of the network 80, it may not be possible to reach a node through a secondary path.

Figure 11:
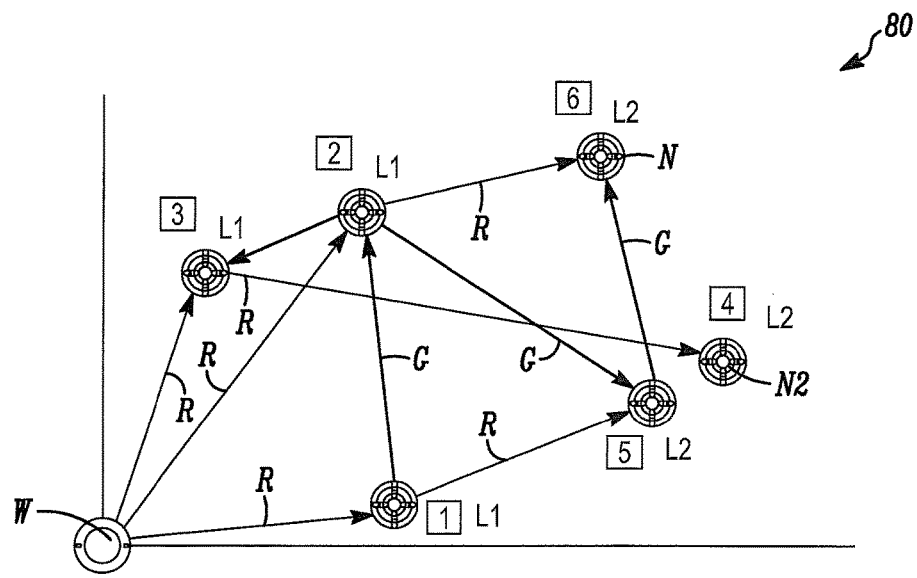
FIG. 11 illustrates a network with an incomplete secondary path.

In FIG. 11, the node N2 with slot=4 cannot have a secondary parent with slot<4 and slot>3 (constraints b, c, d). In such a scenario, to be able to create the secondary path, it is necessary to apply a variant of the algorithm.

Figure 12:
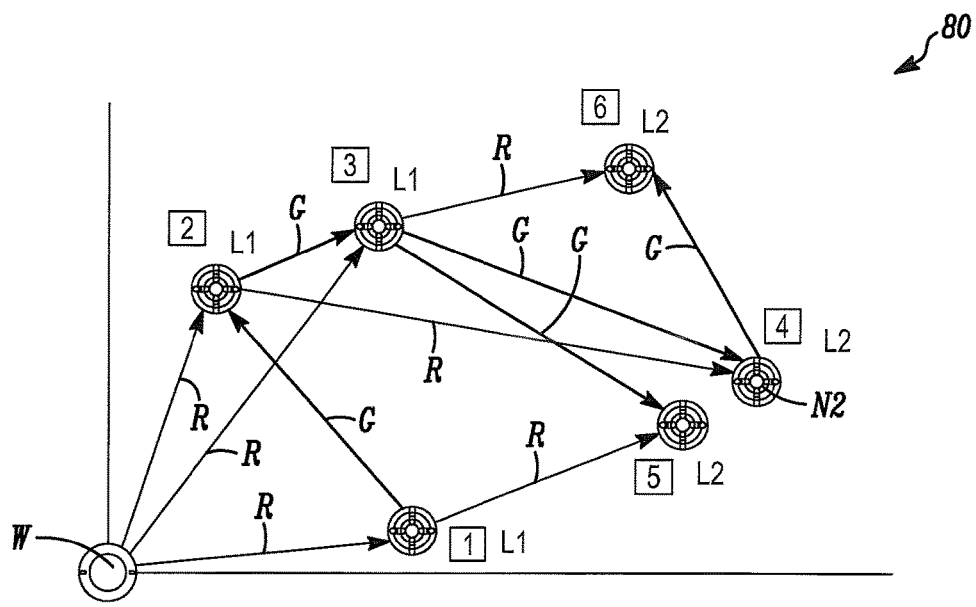
FIG. 12 illustrates the network of FIG. 10 with a complete secondary path.

This variant includes swapping the slots (in pairs) of the nodes of a level lower than the level of the node that it was not possible to reach with the secondary path. Although this operation doesn't change the primary path, it allows for building a complete secondary path. In the illustrated example of FIG. 12, the unreachable node is at level 2. By swapping the slots 2 and 3—both at level 1, a complete secondary path meeting the network constraints is achieved, as illustrated in FIG. 12.

Moreover, even if the variant is unable to create the secondary path, there is a final solution that allows to always creating both primary and secondary paths. Nevertheless, it's important to note that this solution is not optimal from the power consumption point of view since it connects only two nodes to the gateway.

Figure 13:
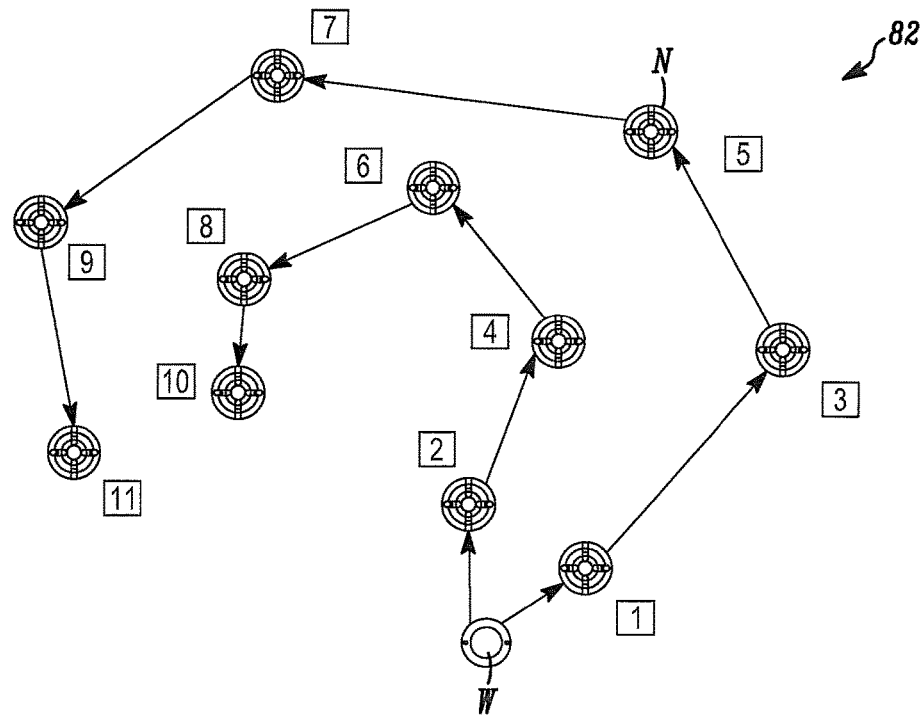
FIG. 13 illustrates the primary path of a network created using an alternate way meeting the double path constraint.
Figure 14:
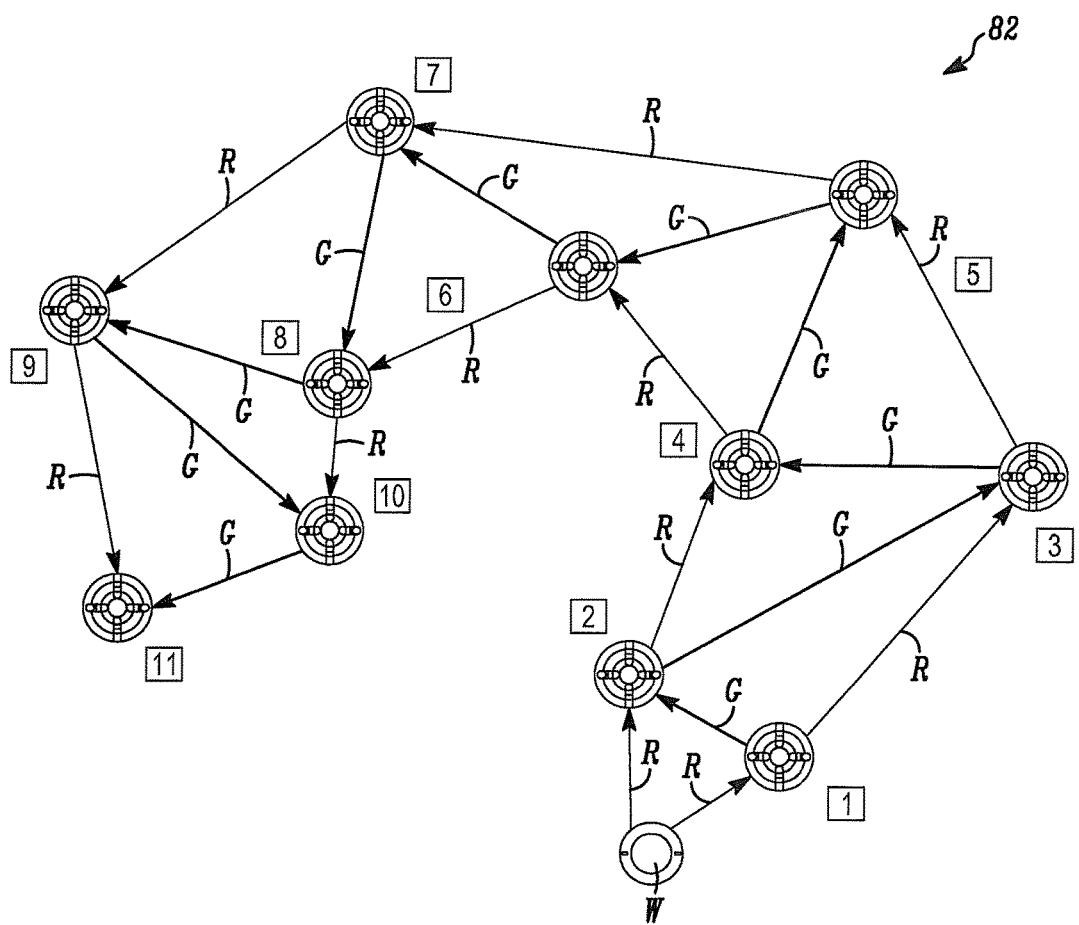
FIG. 14 illustrates a secondary path for the network of FIG. 13.

Starting from the gateway W, two chains can be created with the same number of nodes as the primary path as in the network 82 of FIG. 13. Then, even slots can be assigned to one chain and odd slots to the other. The secondary path will then be created by connecting every node of the network 82, as shown in FIG. 14.

More generally, the process includes:
 a. Creating the two chains with the same number of nodes as the primary path, as in FIG. 13;
 b. Assigning the nodes of the first chain ($C_1$) the even slots;
 c. Assigning the nodes of the second chain ($C_2$) the odd slots; and
 d. Creating a secondary path.

Given S as the slot number assigned to a node, L(x, y), the link between a node assigned at slot x (parent) and the one assigned at slot y (child), provides the basic constraints for nodes allocated at slots 1 and 2. This kind of network is generated by applying the following rules to each node of the network:

For a primary path, use L (S, S+2), and for a secondary path, use L (S, S+1).

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

Further, logic flows depicted in the figures do not require the particular order shown or sequential order to achieve desirable results. Other steps may be provided, steps may be eliminated from the described flows, and other components may be added to or removed from the described embodiments.

The invention claimed is:

1. A method comprising:
   establishing a maximum distance parameter, wherein the maximum distance parameter is calculated by accounting for radio attenuation factors at an installation site and a physical distance between devices;
   assigning an initial network address to a gateway;
   determining a first set of nodes of a plurality of nodes that are within the maximum distance parameter of the gateway;
   assigning a first level value to each of the first set of nodes;
   determining a second set of nodes of the plurality of nodes by each of the first set of nodes searching for no more than two of the plurality of nodes that are within the maximum distance parameter of a respective one of the first set of nodes and that are not included in the first set of nodes to establish a primary path;
   assigning a second level value to each of the second set of nodes, the second level value being one greater than the first level value; and
   assigning network addresses to each of the plurality of nodes, wherein a first node of the first set of nodes is assigned a network address one value greater than the initial network address, and wherein each node in the first set of nodes after the first node is assigned an incrementally higher value network address until all nodes in the first set of nodes are assigned a unique network address.

2. The method as in claim 1 further comprising assigning the network addresses to all nodes in the plurality of nodes.

3. The method as in claim 2 wherein the network addresses are assigned to all nodes in the first set of nodes, before the network addresses are assigned to the second set of nodes.

4. The method as in claim 3 further comprising creating a secondary path between each of the plurality of and the gateway.

5. The method as in claim 4 wherein creating the secondary path includes:
   a first of the plurality of nodes searching for a second of the plurality of nodes within the maximum distance parameter to the first of the plurality of nodes but not connected to the first of the plurality of nodes via the primary path;
   the first of the plurality of nodes connecting to the second of the plurality of nodes; and
   the second of the plurality of nodes searching for a third of the plurality of nodes within the maximum distance parameter to the second of the plurality of nodes but not connected to the second of the plurality of nodes via the primary path.

6. The method as in claim 5 wherein the secondary path comprises a spiral shaped path when viewing the secondary path from above.

7. A communications system comprising:
   a gateway unit; and
   a plurality of secondary units,
   wherein each of the plurality of secondary units communicates with at least one other of the plurality of secondary units and the gateway unit by at least first and second communications paths,
   wherein a length of branches of the first and second communications paths is less than or equal to a predetermined distance related parameter, and
   wherein the length of the branches of the first and second communications paths is less than or equal to an adjusted distance related parameter taking into account radio attenuation factors at an installation site.

8. The communications system as in claim 7 wherein each of the plurality of secondary units and the gateway unit communicate wirelessly.

9. The communications system as in claim 7 wherein each of the plurality of secondary units is battery powered.

10. The communications system as in claim 9 wherein distances between communicating secondary units of the plurality of secondary units minimize power consumption.

11. The communications system as in claim 7 wherein at least one of the plurality of secondary units comprises an ambient condition detector.

12. The communications system as in claim 7 wherein the gateway unit comprises a wireless interface for an alarm monitoring system.

* * * * *